United States Patent
Ebel et al.

[11] Patent Number: 5,812,254
[45] Date of Patent: Sep. 22, 1998

[54] ILLUMINATION SYSTEM FOR OPHTHALMIC LENS INSPECTION

[75] Inventors: James A. Ebel; Russell J. Edwards, both of Jacksonville, Fla.

[73] Assignee: Johnson & Johnson Vision Products, Inc., Jacksonville, Fla.

[21] Appl. No.: 743,568

[22] Filed: Nov. 4, 1996

Related U.S. Application Data

[63] Continuation of Ser. No. 371,941, Jan. 12, 1995, abandoned, which is a continuation of Ser. No. 994,388, Dec. 21, 1992, abandoned.

[51] Int. Cl.⁶ .................................................. G01B 9/00
[52] U.S. Cl. .......................................................... 356/124
[58] Field of Search ................................... 356/121–123, 356/124–127, 445–446, 239–240, 238, 129; 250/223 R, 223 B; 362/113, 341, 197, 296; 351/219, 229, 243, 245, 159

[56] References Cited

U.S. PATENT DOCUMENTS

| | | | |
|---|---|---|---|
| 3,483,390 | 12/1969 | Walker | 356/240 |
| 3,666,885 | 5/1972 | Hemsley et al. | 356/23 |
| 3,770,969 | 11/1973 | Ansevin et al. | 356/240 |
| 3,917,391 | 11/1975 | Padula et al. | 353/80 |
| 3,985,445 | 10/1976 | Tagnon | 356/125 |
| 3,988,068 | 10/1976 | Sprague | 356/124 |
| 3,991,882 | 11/1976 | Fahnestock et al. | 356/237 |
| 4,002,823 | 1/1977 | Van Oosterhout | 356/237 |
| 4,281,927 | 8/1981 | Dzuban | 356/124 |
| 4,317,613 | 3/1982 | Grosser | 350/89 |
| 4,691,231 | 9/1987 | Fitzmorris et al. | 356/240 |
| 4,733,360 | 3/1988 | Kobayashi et al. | 364/507 |
| 4,815,844 | 3/1989 | Schmalfuss et al. | 356/237 |
| 4,817,166 | 3/1989 | Gonzalez et al. | 382/1 |
| 5,081,685 | 1/1992 | Jones et al. | 382/1 |
| 5,100,232 | 3/1992 | Smith et al. | 356/124 |
| 5,268,735 | 12/1993 | Hayashi | 356/237 |

FOREIGN PATENT DOCUMENTS

| | | |
|---|---|---|
| 2057832 | 6/1992 | Canada . |
| 82103214 | 11/1982 | European Pat. Off. . |
| 79 19148 | 3/1980 | France . |
| 3432002 C2 | 11/1987 | Germany . |
| 59-108934 | 6/1984 | Japan . |
| 59-160734 | 9/1984 | Japan . |
| 2-257007 | 10/1990 | Japan . |

*Primary Examiner*—Hoa Q. Pham

[57] ABSTRACT

A system for providing diffuse illumination in the inspection of ophthalmic lenses for use in conjunction with a computer-based lens inspection apparatus. Below a package containing an ophthalmic lens in deionized water is an optical diffuser made of flashed opal and below that a light source such as a strobe light. The strobe lamp firing is initiated by the image processing system which is in turn triggered by a signal generated by the arrival of a package containing a lens to be inspected. In the preferrerd embodiment, an arc tube is employed wherein light output diminishes by darkening only in one end of the tube, that end placed outside the reflector.

9 Claims, 1 Drawing Sheet

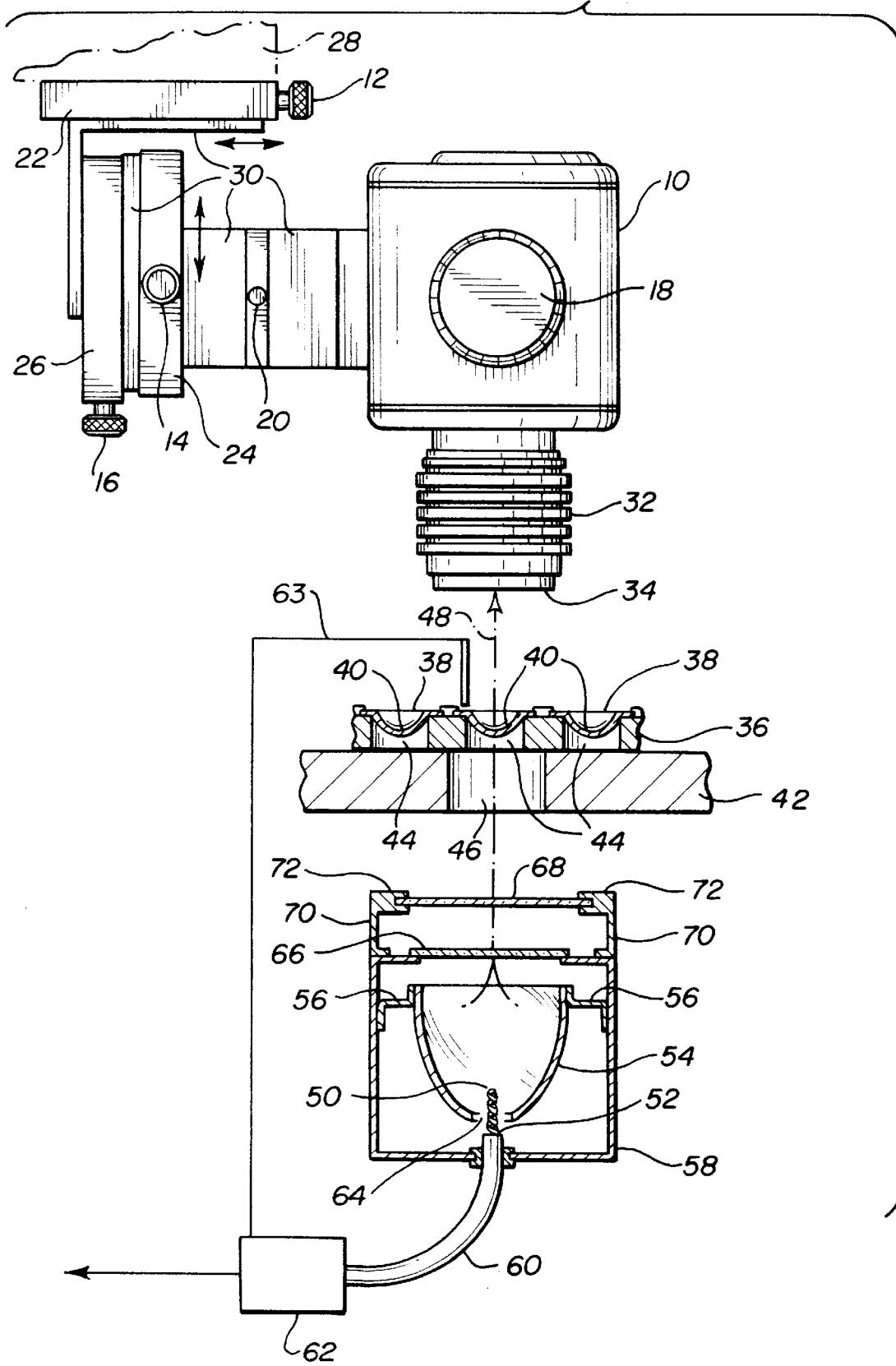

ILLUMINATION SYSTEM FOR OPHTHALMIC LENS INSPECTION

This is a continuation of application Ser. No. 08/371,941, filed Jan. 12, 1995, which is a continuation of application Ser. No. 07/994,388 filed on Dec. 21, 1992, both now abandoned.

BACKGROUND OF THE INVENTION

Previously devised systems for the inspection of ophthalmic lenses, especially molded hydrophilic contact lenses, employed human inspection utilizing trays having a rectangular array of wells in which the lenses were submerged in saline solution.

A problem associated with the inspection of ophthalmic lenses is that the lens itself is optically transparent and therefore does not show the usual light and dark features that are found in the inspection of more routine objects.

Heretofore a human inspector viewed each of the lenses under magnification in order to verify that the lens meets each of its required characteristics. In these systems, the tray containing lenses and saline is transferred to an inspection station attended by a human operator. When the tray is placed in the inspection station, a viewing assembly is positioned above a first well. The lens in the well is illuminated from below and an image is transferred by the viewing apparatus and projected upon a screen at the inspector's eye-level. The inspector manually varies the field-of-focus to examine different depths of the lens.

Current human conducted inspection methods employ the schlieren method of dark field illumination well known in the art, particularly for the study of transparent fluid flow and optical component inspection. In this method, light from a point source is collimated by a lens which then passes through the medium (i.e. lens) under study. The light is then focused by a second lens directly onto a knife edge. Any light deflected by a refractive non-uniformity in the lens (albeit transparent) is not focused at the knife edge. Light thus deflected from interruption by the knife edge is then projected onto a screen by an object lens and a light spot thus occurs on the an otherwise dark projection screen corresponding to the non-uniformity.

After looking for the appropriate lens characteristics and deviations from accepted standards, the human inspector makes a decision as to whether the lens is acceptable. The inspector often finds its useful to move or displace the lens slightly relative to the tray well in which it is contained, or to otherwise disturb the saline solution in order to distinguish between foreign particles in the saline and imperfections in the tray well from characteristics or defects of the lens.

The inspector enters his decision by pushing the appropriate electrical switch to indicate that the lens is either acceptable or to be rejected. The viewing mechanism then indexes over to the next well in the tray where the inspection procedure is repeated. As can be appreciated, certain time constraints must be placed upon the inspector such that if a decision is not made within a predetermined amount of time, the lens is automatically considered defective, and the viewing apparatus indexes to the next well. Likewise, lenses that may otherwise be acceptable but are accompanied by extraneous pieces of foreign material or if two lenses are found in the same well, the situation is considered unacceptable and the contents of the well rejected.

Upon the completion of the inspection of an entire tray of lenses, the inspector activates another electrical switch to initiate disposition of the lenses of the tray just inspected. A disposal unit visits each well of the tray where an unacceptable lens was indicated to suction out and dispose of those lenses. The tray is then transferred along for the packaging of the acceptable lenses.

Although the inspectors are highly trained and are given objective criteria by which to judge the quality and ultimate acceptability of the lenses, one skilled in the art can appreciate that human inspection leaves much to be desired. Human inspectors lack inspector-to-inspector uniformity, and repeatability by a single inspector may be lacking based on the inspector's mental condition and accumulated fatigue. An ophthalmic lens manufacturer, therefore, conservatively rejects many lenses that are acceptable on an objective basis because of limitations in the inspection process.

As the ophthalmic lens industry has grown human inspection has imposed a large manpower and financial burden on the industry and requires a tedious task on the part of the inspector. Particularly with regard to contact lenses that are provided for periodic frequent replacement the number of lenses that need to be produced and, therefore, inspected increases dramatically.

To increase uniformity and decrease the number of falsely rejected lenses, an automated inspection system can be implemented where an image of the lens to be inspected is captured using a lamp and a camera and the image then digitized and processed by a computer to make a determination whether the lens is acceptable.

Because of the limited field-of-view of a camera system, and the desire to utilize the field to the maximum extent, it is important that the lens be centered in the field while it is being carried so that lenses are found in a repeatable position from one lens to the next.

A package for ophthalmic lenses having a bowl with a radius of curvature larger than the radius of the lens placed inside the bowl allows the lens to center and settle in the middle of the bowl. When constructed of a non-nucleated polymer, the surface is sufficiently wettable so that when water is placed in the bowl, the water meniscus is substantially flattened in the center and associated optical aberrations are thereby eliminated, permitting undistorted in-package inspection.

A more detailed description of the preferred embodiment of the lens package is given in copending U.S. application Ser. No. 07/995,607 filed concurrently with this application.

The camera of such an automated lens inspection system is operated in an asynchronous fashion using a signal generated by the lens and package moving into the proper location to trigger both the firing of the strobe and subsequent transfer of the image.

Due to the manner in which an image is captured by the camera, a second requirement is that the image be as clear as possible and not blurred by vibration of the lens, the solution in which it is placed, or by motion of the lens package.

A pallet with wells for receiving the containers comprise holes that pass through the pallet. These holes along with a guide and transport system make possible an arrangement of the lamp and camera for capturing an image of a lens that maximizes utilization of the field-of-view of the camera and minimizes blurring.

A high resolution solid state camera such as the Videk MegaPlus® camera made by Kodak of Rochester, N.Y. is employed. This camera comprises a lens fixed on a 14.5 millimeter field-of-view. The camera is fitted with a Nikkor 55 millimeter standard lens set at f/2.8 and attached to an Andover bandpass filter centered at a wavelength of 550 nm with a 10 nm full wave half height (FWHH) to the end of the camera lens. Such a filter removes chromatic aberrations thereby improving overall spatial resolution and maintains a photopic response to the lens inspection similar to a human inspector's ocular response. This filter also removes infrared at the CCD detector which would decrease the overall system modulation transfer function (MTF).

The method of capturing an lens image with a camera and determining whether a lens is acceptable once an image is captured by the camera and reduced to digital data is described in copending U.S. application Ser. No. 07/993,756 filed concurrently with this application.

A requirement of an illumination system used to inspect transparent objects such as ophthalmic lenses, is to provide a source of light which is sufficiently diffuse so as to not reveal artifacts (details or non-uniformities) of either the lamp itself or of the package containing the lens.

It has been the previous practice to use either a schlieren illumination system as described above, or a projection type system. While a projection type illumination system will sufficiently hide the structure of the light source, the shortcoming in using it with a system for in-package inspection is that the contrast of package details is highlighted. As is readily appreciated, imposing package details on the lens image obtained by the camera would, at a minimum, slow the processing of the digitized image by the inspection algorithm, and possibly cause false rejection of some lenses or even cause the algorithm to fail entirely.

The object of the present invention is, therefore, to provide an illumination system that allows the light produced to pass through the structure of the inspection apparatus, through a lens container pallet to be electronically imaged while the pallet, container and lens are in motion and that is compatible with the operating requirements of the above inspection systems, particularly those of suppressing the details of both the light source and of the package.

More particularly, it is the object of the present invention to provide a strobe illumination system capable of being triggered at the appropriate time by the inspection transport system and producing a flash of light of short duration, but high intensity and uniformity to produce an non-blurred image in the camera adequate to be digitized and mathematically processed.

Both of these objects must be met while permitting the lamp and camera to be positioned to allow the camera to capture a high quality image of the lens. It is preferable that the above objectives be achieved while the lamp and camera are on opposite sides of the lens allowing the light to pass through the lens, an image to be captured by the camera then digitized.

It is a final object of the invention to provide an illumination system that produces consistent illumination from strobe flash to strobe flash, and in particular, consistent illumination over an extended life of the flash tube.

SUMMARY OF THE INVENTION

The above objects are achieved by a system for providing diffuse illumination in the inspection of ophthalmic lenses, transparent in nature, for use in conjunction with a computer-based inspection apparatus that analyzes a digitized image of an ophthalmic lens.

Below a package containing an ophthalmic lens in deionized water is an optical diffuser made of flashed opal and below that a light source such as a strobe light. The strobe lamp is capable of firing a 5 Joule, 10 microsecond pulse of light initiated by the image processing system which is in turn triggered by a signal generated by the arrival of a package containing a lens to be inspected. Typically a 450 millisecond recovery time is needed for the strobe to recharge between firings. In the preferred embodiment, an arc tube is employed wherein light output diminishes by darkening only in one end of the tube, that end placed outside the reflector.

DESCRIPTION OF THE DRAWINGS

The FIGURE shows the present invention partially in cross-sectional view and partially in a planar elevational view.

DESCRIPTION OF THE PREFERRED EMBODIMENT

Referring to the figure, there is shown camera 10 having an x axis (the axis of lens container movement) adjustment knob 12, a y axis adjustment knob 14, and a z axis adjustment knob 16. Adjustment knob 18 provides rotational adjustment in the x,y plane and knob 20 provides rotational adjustment in the y,z plane.

These adjustment knobs are attached to x,y and z axis stages 20, 24 and 26 respectively. Ultimately, these are attached through the x axis stage to the mounting structure 28 through brackets 30.

Camera 10 comprises a lens 32, which may be an adjustable focus lens, and bandpass filter 34. The bandpass filter is such as the 550FS10-50 model available from Andover Corporation of Salem, N.H. This filter is centered at a wavelength of 550 nanometers where it transmits 70% of the incident light while transmitting essentially zero energy at wavelengths which are 10 nanometers off the 550 nm center. The functioning of the camera is described in more detail in the above-referenced patent application for the inspection algorithm.

Found below the camera is a transport pallet 36 holding lens containers 38 wherein rest lenses 40. The lenses are substantially surrounded by liquid, preferably deionized water (not shown), in containers 38. The liquid surrounding the lens in the lens container forms a lens having a positive optical power, and the camera lens can be varied to compensate for the positive optical power of the liquid in the lens container and focus the lens image in the camera.

The pallet is transported along a conveyance rail 42, described in more detail in the above referenced patent application describing a lens transport system.

A more detailed description of the preferred embodiment of the lens transport system and pallet system with illumination triggering are given in copending U.S. application Ser. Nos. 07/994,249 and 07/994,242 (attorney docket VTN-49 and VTN-50) filed concurrently with this application.

As seen in the figure, pallet 36 and conveyance rail 42 contain apertures 44 and 46, respectively.

When pallet 36 is appropriately aligned along the x axis, the center of the pallet aperture 44 and the center of the conveyance rail aperture 46 lie in a common line with the center of the camera lens 32 along an optical axis 48.

Below the conveyance rail is the light source. The strobe lamp is capable of firing a 5 Joule, 10 microsecond pulse of light initiated by the image processing system which is in turn triggered by a signal generated by the arrival of a package containing a lens to be inspected. Typically a 450 millisecond recovery time is needed for the strobe to recharge between firings. The light source is comprised of arc tube 50 surrounded by a flash lamp coil 52.

The conveyance rail aperture 46 is adjustable to different diameters, from substantially closed to open as wide as the pallet aperture 44. Thus conveyance rail aperture 46 located between the diffuser and the lens container, limits the cone angle of the light incident upon the lens container and can be manually adjusted to supply the appropriate amount of light.

Surrounding the light source is a parabolic reflector 54, which preferably is a rotational parabola, held in place by a reflector mount 56. The reflector mount in turn is attached to the lamp housing 58. High voltage cables 60 are electrically connected to the flash lamp coil 52 and to the high voltage power supply 62. The high voltage power supply is turned on by a triggering means 63 described in detail in the above-referenced patent application describing a pallet for transporting lens containers.

The center of the flash lamp 50, as well as the optical axis of the parabolic reflector 54 is located along optical axis 48.

The parabolic reflector has an opening 64 along the optical axis 48. Above the opening 64 between the flash lamp 50 and the lens container 38 is located a glass plate 66. This glass plate seals the lamp chamber from the external environment, including dust and moisture. Also between the flash lamp and the container undergoing inspection along optical axis 48, is located diffusing glass 68 which acts as an optical diffuser. The diffusion glass is held above the lamp by standoffs 70 and held in place by diffusion holder 72.

The distance between the lamp 50, diffuser 68 and the lens container 38 is made variable by a conventional vertical adjustment mechanism (not shown). These adjustments (along with adjustment of conveyance rail aperture 46) are made to highlight lens contrast while eliminating lens container and lamp structure and energy losses due to the positive optical power of the lens container\deionized water combination.

The strobe flash lamp is available from Perceptics Corporation of Knoxville, Tenn. As with all lamps, when in use material from the filament or electrodes will vaporize and be deposited elsewhere in the bulb or arc tube. The lamp of the preferred embodiment that is employed is of a design where deposits from vaporization of the electrodes causes the electrode material to be deposited preferentially in one end of the arc tube. According to the preferred embodiment of this invention, such an arc tube is placed with that end receiving the deposits outside the end of the reflector as shown in the figure. The coil is 60 mm long and 25 mm in diameter, with 35 mm of the arc tube outside of the reflector.

Although a portion of the available light is lost outside the reflector, this arrangement has the advantage of producing a consistent light output over a significant part of the lamp's life. Because the lamp first darkens in the bottom portion of the lamp which is outside the reflector, the portion within the reflector that provides the light for this illumination system remains consistent until the darkening reaches into that portion of the lamp in the reflector. It is expected that such a lamp as specified above, arranged according to the invention will function for at least one year at 30 Hz at an output of 5 J (approximately $10^9$ flashes) before requiring replacement due to diminished light output.

We claim:

1. An illumination and imaging subsystem for use with a contact lens inspection system having a lens carrier holding a plurality of contact lenses in a fluid solution, wherein the fluid solution forms an optical lens having a positive optical power, the illumination and imaging subsystem comprising:

a strobe lamp for generating light pulses;

an electric power source connected to the strobe lamp to provide electric power for the strobe lamp;

triggering means to activate the electric power source to supply electric power to the strobe lamp to generate light pulses in response to the presence of the lens carrier;

a camera for receiving images of the contact lenses;

a reflector surrounding at least a portion of the strobe lamp and forming an opening to direct light from the strobe lamp, through the contact lenses and into the camera to produce images of the contact lenses in the camera;

wherein the camera includes a variable focus lens to compensate for the positive optical power of the fluid solution and to focus the contact lens images in the camera;

a diffuser located between the strobe lamp and the lens carrier to diffuse the light from the lamp; and means defining an aperture, between the diffuser and the lens carrier, to limit the cone angle of the light incident on the lenses.

2. An illumination and imaging subsystem according to claim 1, wherein the reflector is a rotational parabola.

3. An illumination and imaging subsystem according to claim 1, wherein:

the strobe lamp and the camera define an optical axis; and the strobe lamp extends outside the reflector, on said optical axis, in a direction away from said aperture.

4. An illumination and imaging subsystem according to claim 1, wherein:

the strobe lamp includes a portion extending outside the reflector in a direction away from said aperture; and electrode material is deposited on, and darkens, said portion of the strobe lamp.

5. An illumination and imaging subsystem according to claim 1, wherein the distance between the lens carries and the lamp is variable.

6. An illumination and imaging subsystem according to claim 1, wherein the aperture is variable.

7. An illumination and imaging subsystem according to claim 1, further including means supporting the camera for movement in three mutually orthogonal directions.

8. An illumination and imaging subsystem according to claim 7, wherein the supporting means includes means to adjust the position of the camera in each of said three directions.

9. An illumination and imaging subsystem according to claim 1, wherein:

the means defining the aperture includes a conveyance rail; and the lens carrier is supported by the conveyance rail as the lens carrier moves past the camera.

* * * * *